United States Patent
Desai et al.

(10) Patent No.: US 9,442,778 B2
(45) Date of Patent: Sep. 13, 2016

(54) METHOD AND SYSTEM FOR SECURED INTER-APPLICATION COMMUNICATION IN MOBILE DEVICES

(71) Applicant: salesforce.com, inc., San Francisco, CA (US)

(72) Inventors: Sachin Desai, San Francisco, CA (US); Qingqing Liu, Dublin, CA (US); Ronald Fischer, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/036,106

(22) Filed: Sep. 25, 2013

(65) Prior Publication Data

US 2014/0095874 A1    Apr. 3, 2014

Related U.S. Application Data

(60) Provisional application No. 61/708,366, filed on Oct. 1, 2012.

(51) Int. Cl.
   *G06F 9/54*    (2006.01)
   *H04L 29/06*   (2006.01)
   *H04W 12/06*   (2009.01)

(52) U.S. Cl.
   CPC ............... *G06F 9/54* (2013.01); *G06F 9/544* (2013.01); *H04L 63/0815* (2013.01); *H04L 63/10* (2013.01); *H04L 63/126* (2013.01); *H04W 12/06* (2013.01)

(58) Field of Classification Search
   CPC combination set(s) only.
   See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |

(Continued)

OTHER PUBLICATIONS

Zhang (Zhang et al., "XenSocket: A Hight-Throughput Interdomain Transport for Virtual Machines", Middleware 2007, Lecture Notes in Computer Science vol. 4834, 2007, pp. 184-203).*

(Continued)

*Primary Examiner* — Peter Poltorak
(74) *Attorney, Agent, or Firm* — Dergosits & Noah LLP; Todd A. Noah

(57) ABSTRACT

This disclosure describes a method for accessing network resources which includes receiving by a first application in a mobile computing device sign-in information from a user and enabling the user to sign in to a second application with the first application to access network resources from a resource server based on (a) a first application identification (ID) of the second application, (b) the user authorizing the second application to the resource server, and (c) receiving an authorization grant from the resource server to enable the second application to access the network resources, the mobile computing device coupled with the resource server via a network.

10 Claims, 11 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,721,686 B2 * | 4/2004 | Malmskog | H04L 12/2697 702/122 |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,051,125 B1 * | 5/2006 | Flott, Jr. | H04Q 11/0492 709/204 |
| 7,062,502 B1 | 6/2006 | Kesler | |
| 7,069,497 B1 | 6/2006 | Desai | |
| 7,281,047 B2 * | 10/2007 | Hayko | G06F 8/60 709/229 |
| 7,340,411 B2 | 3/2008 | Cook | |
| 7,356,482 B2 | 4/2008 | Frankland et al. | |
| 7,401,094 B1 | 7/2008 | Kesler | |
| 7,603,483 B2 * | 10/2009 | Psounis et al. | 709/247 |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,924,707 B2 * | 12/2014 | Majumdar | 713/152 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0112089 A1 * | 8/2002 | Zargham et al. | 709/317 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2002/0181395 A1 * | 12/2002 | Foster | H04L 49/357 370/229 |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0065784 A1 * | 4/2003 | Herrod | H04W 28/18 709/227 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0158974 A1 * | 8/2003 | Herrod | G06F 13/105 719/328 |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0083372 A1 * | 4/2004 | Williamson | H04L 63/145 713/188 |
| 2004/0103193 A1 * | 5/2004 | Pandya et al. | 709/224 |
| 2004/0128001 A1 | 7/2004 | Levin et al. | |
| 2004/0162871 A1 * | 8/2004 | Pabla | H04W 8/005 709/201 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0205769 A1 * | 10/2004 | Ruutu | H04L 67/10 719/313 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0021680 A1 * | 1/2005 | Ekis et al. | 709/219 |
| 2005/0050555 A1 | 3/2005 | Exley et al. | |
| 2005/0091098 A1 | 4/2005 | Brodersen et al. | |
| 2005/0175016 A1 * | 8/2005 | Kim | H04L 69/16 370/395.52 |
| 2006/0075123 A1 * | 4/2006 | Burr | H04L 29/12311 709/228 |
| 2007/0078917 A1 * | 4/2007 | Edrey | 708/109 |
| 2008/0184273 A1 * | 7/2008 | Sekar | 719/319 |
| 2008/0295112 A1 * | 11/2008 | Muscarella | G06F 21/606 719/31 |
| 2009/0063415 A1 | 3/2009 | Chatfield et al. | |
| 2009/0083756 A1 * | 3/2009 | Kim | G06F 9/544 719/312 |
| 2009/0100342 A1 | 4/2009 | Jakobson | |
| 2009/0177744 A1 | 7/2009 | Marlow et al. | |
| 2010/0057932 A1 * | 3/2010 | Pope et al. | 709/236 |
| 2011/0313753 A1 * | 12/2011 | Green | H04L 12/18 |

(56) References Cited

U.S. PATENT DOCUMENTS

| | | | |
|---|---|---|---|
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0068636 A1* | 3/2014 | Dupont | G06F 9/46 719/318 |
| 2014/0095874 A1* | 4/2014 | Desai | H04L 63/0815 713/168 |
| | | | 703/28 |
| 2014/0112278 A1* | 4/2014 | Liang | H04L 69/162 370/329 |
| 2014/0286316 A1* | 9/2014 | Park | H04W 36/22 370/332 |
| 2014/0359537 A1 | 12/2014 | Jackobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |

OTHER PUBLICATIONS

U.S. Appl. No. 13/986,251, filed Apr. 16, 2013.

* cited by examiner

METHOD AND SYSTEM FOR SECURED INTER-APPLICATION COMMUNICATION IN MOBILE DEVICES

CLAIM OF PRIORITY AND RELATED APPLICATION DATA

This application claims priority to U.S. Provisional Patent Application No. 61/708,366, filed on Oct. 1, 2012, entitled "System and Method for Secure Inter Application Communication in Mobile Devices," by Desai et al., which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates generally to network authentication, and more specifically to the authentication associated with mobile applications.

BACKGROUND

The popularity of mobile devices (e.g., smart phones, tablets, etc.) and mobile applications has increased significantly in recent years. There are mobile applications for different mobile operating systems (e.g., iOS of Apple, Android of Google, Windows Mobile of Microsoft, etc.). Users may use the mobile applications to play games, read news information, check emails, etc. Many corporations also develop mobile applications so their employees can access company information, be connected with other employees from anywhere, and increase their productivity by using their mobile devices. The information accessed by the employees may be confidential information (e.g., marketing information, product information, etc.) Developers are constantly trying to develop methods to identify and remove potential security risks to protect the confidential information from being intercepted by hackers and malware.

BRIEF DESCRIPTION OF THE DRAWINGS

The included drawings are for illustrative purposes and serve only to provide examples of possible structures and process steps for the disclosed techniques for secured inter-application communication and single sign-on mechanisms. These drawings in no way limit any changes in form and detail that may be made to implementations by one skilled in the art without departing from the spirit and scope of the disclosure.

DETAILED DESCRIPTION

Figure 1:
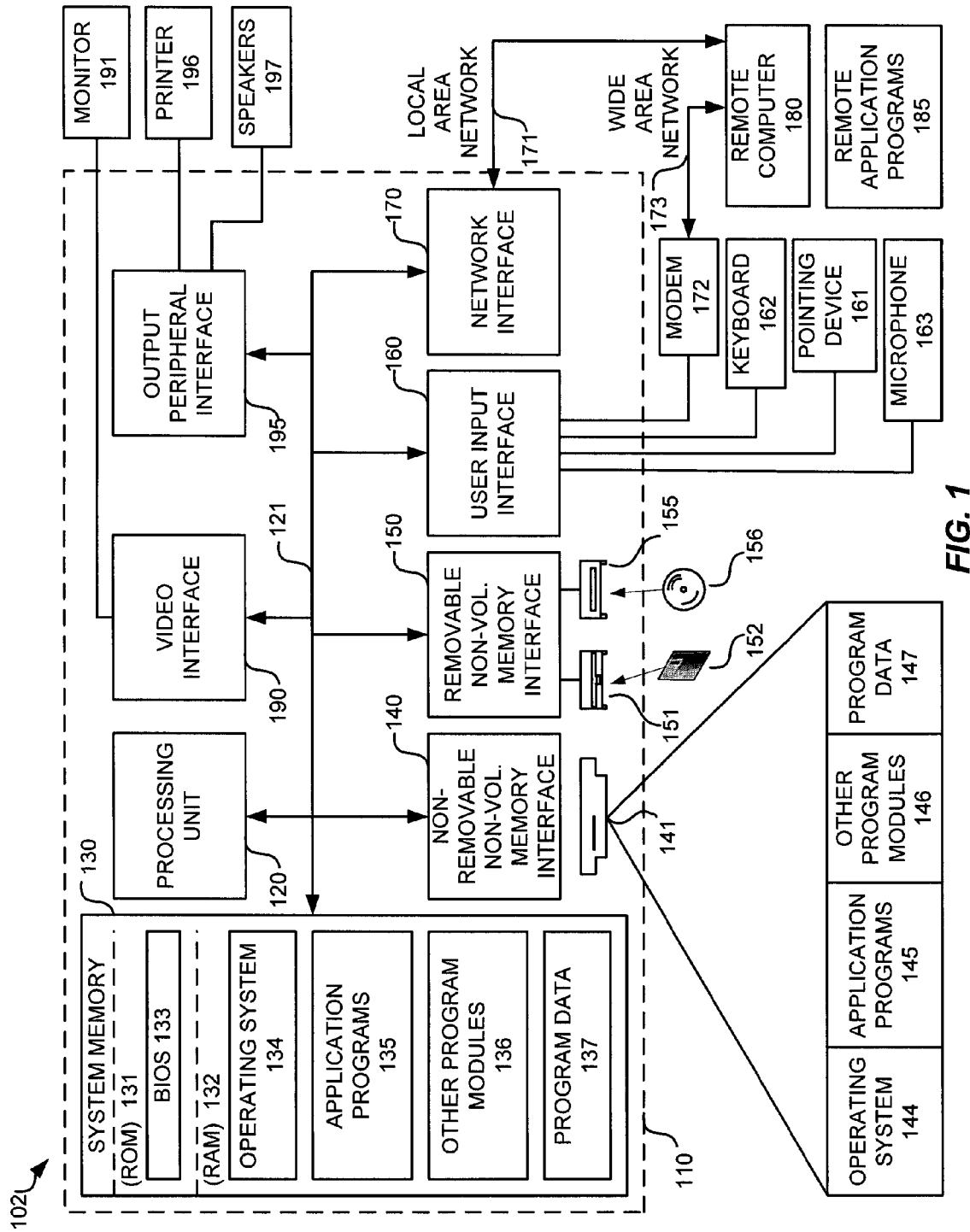
FIG. 1 shows an example computing device that may be used to implement secured inter-application communication and single-sign on mechanism, in accordance with some implementations.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

In some implementations, techniques described herein may facilitate a secured inter-application communication among mobile applications running on the same mobile computing device. The communication may be established by an operating system running on the mobile computing device. A first end point may be assigned to a source mobile application. The first end point may be associated with a first port identification (ID). Information about the first end point may be communicated to a target mobile application by invoking the target mobile application. The target mobile application may transfer information to the first mobile application via the first end point.

In some implementations, techniques described herein may facilitate a secured inter-application communication among mobile applications running on the same mobile computing device. The communication may be established by an operating system running on the mobile computing device. A first end point may be assigned to a source mobile application. The first end point may be associated with a first port identification (ID). Information about the first end point may be communicated to a target mobile application by invoking the target mobile application. Based on the invocation, a second end point may be assigned to the target mobile application. The second end point may be associated with a second port ID. The first end point may be configured to be associated with the second end point by the operating system. Information transferred from the first mobile application to the second mobile application may be performed via the end point. Information transferred from the second mobile application to the first mobile application may be performed via the first end point.

In some implementations, techniques described herein may facilitate verifying a mobile application as a trusted mobile application by a server or cloud. A mobile application may be associated with a unique identification associated with an application distribution center. The unique identification may have been verified as being associated with trusted mobile application and stored in the server or cloud. Based on the mobile application having been installed on a mobile computing device, the unique identification may be communicated to the server or cloud by the mobile computing device to enable the mobile computing device to verify whether the mobile application can be trusted.

In some implementations, techniques described herein may facilitate a single sign-on mechanism. A user may sign on to a web server via a source mobile application. The user may cause a target mobile application to invoke the source mobile application. The source mobile application may request the web server to authenticate the target application. Upon receiving an authorization grant from the web server, the target mobile application can access information from the web server on behalf of the user without the user having to provide sign-on information to the target application.

In some implementations, techniques described herein may facilitate a source mobile application to request a target mobile application to perform operations as if the target mobile application is an extension of the source mobile application. A user may sign on to a web server using a source mobile application. The target mobile application may be activated using the single sign-on mechanism and perform functions on behalf of the user using the first mobile application as a proxy. Control may be transferred from the target mobile application to the source mobile application to enable the source mobile application to perform functions on behalf of the user using the target mobile application as a proxy. Using the same scheme, the source mobile application may be configured to use the target mobile application as a gateway to invoke other mobile applications.

FIG. 1 is a diagram of an example computer system that may be used with some implementations of the present invention. The computing system 102 is only one example of a suitable computing system, such as a mobile computing device, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, minicomputers, mainframe computers, distributed computing environments that include any of the above systems or devices, and the like. For example, the computing device 102 may be implemented as a mobile computing device such as one that is configured to run with an operating system (e.g., iOS) developed by Apple Inc. of Cupertino, Calif. or an operating system (e.g., Android) that is developed by Google Inc. of Mountain View, Calif.

Some implementations of the present invention may be described in the general context of computing device executable instructions, such as program modules, being executed by a computer. Generally, program modules include routines, programs, objects, components, data structures, etc. that performs particular tasks or implement particular abstract data types. Those skilled in the art can implement the description and/or FIGS. herein as computer-executable instructions, which can be embodied on any form of computing machine readable media discussed below.

Some implementations of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing device 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing device 102 typically includes a variety of computer readable media. Computer readable media can be any available media that can be accessed by computing device 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing device 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing device 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing device 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing device 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing device 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing device 102 may be connected to the LAN 171 through a network interface or adapter 170. When used in a WAN networking environment, the computing device 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing device 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computer system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing devices may be a laptop computer, a tablet computer, a Netbook, a smart phone, a personal digital assistant, or other similar device with on board processing power and wireless communications ability that is powered by a Direct Current (DC) power source that supplies DC voltage to the mobile computing device and that is solely within the mobile computing device and needs to be recharged on a periodic basis, such as a fuel cell or a battery.

Figure 2:
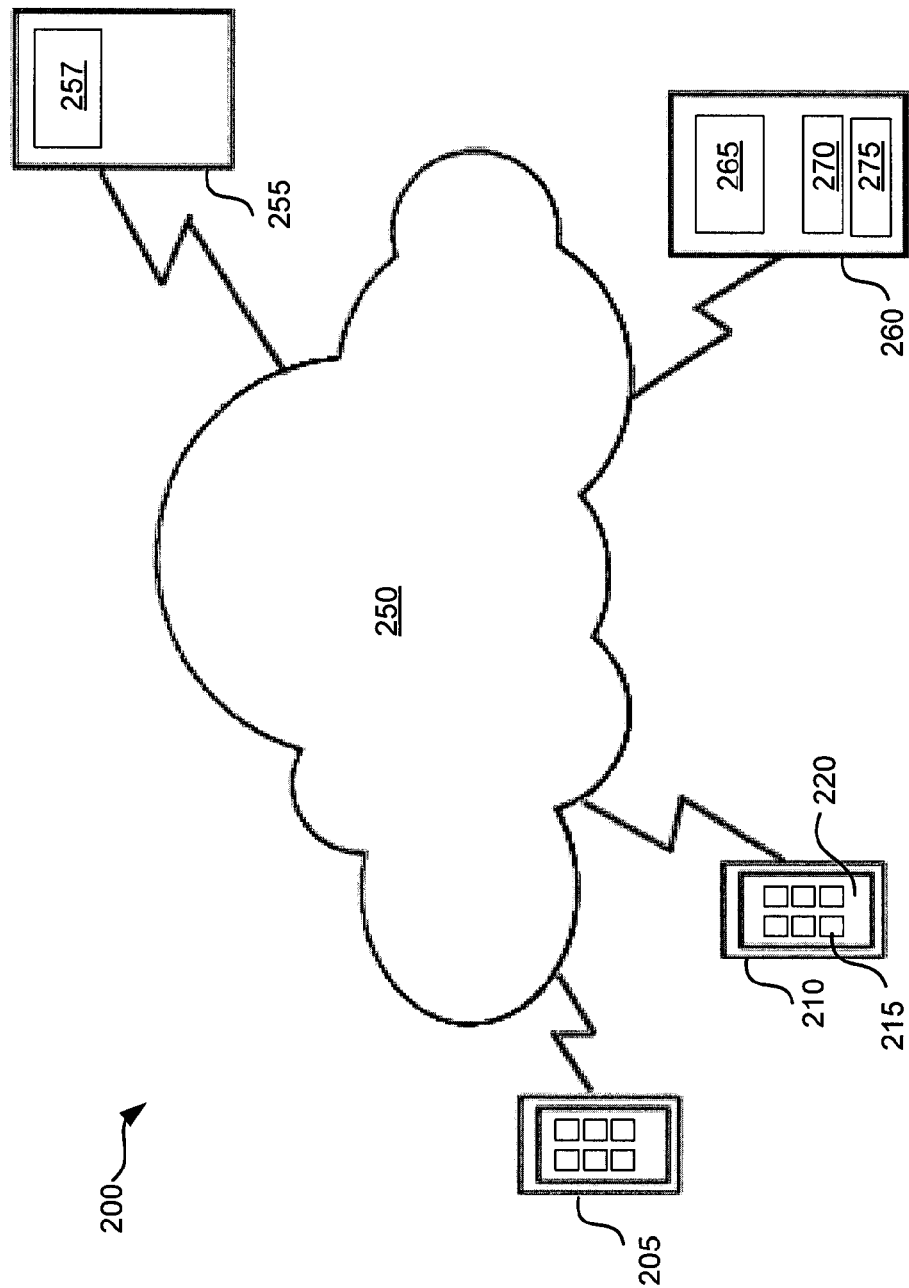
FIG. 2 shows an example network environment that may be used with some implementations.

FIG. 2 is a diagram of an example network environment that may be used with some implementations of the present invention. Diagram 200 includes mobile computing devices 205 and 210 which may be connected to the network 250 via a cellular connection or via a Wi-Fi router (not shown). The network 250 may be the Internet. The mobile computing devices 205 and 210 may be coupled with one or more server computing devices 255 and 260 via the network 250. The server computing devices 255 and 260 may be web servers associated with service providers. For example, a user using the mobile computing device 205 (e.g., iPhone) may connect to the server computing device 255 (e.g., App Store server) and log into the application distribution center 257 (e.g., App Store) to download mobile applications 215. The server computing device 255 may be referred to as an application distribution server because it is configured to include logic of the application distribution center 257. As another example, the server computing device 260 may be associated with a large corporation (e.g., salesforce.com), and an employee of the corporation may use the mobile computing device 210 to stay connected with their colleagues by logging into an application 265 (e.g., Chatter application) hosted on the server computing device 260. For some implementations, the server computing device 260 (also referred to as a verification server) may be configured to maintain a white list 270 of trusted mobile applications that may be downloaded and installed onto the mobile computing devices 205 and 210. For some implementations, the server computing device 260 may also be configured to include a verification module 275 to perform verification of the mobile applications based on the white list 270.

The mobile computing device 210 may be configured to run with one or more mobile applications 215. These mobile applications may have been pre-installed, or they may have been downloaded from appropriate application distribution centers (e.g., App Store of Apple Inc., Google Play of Google Inc., AppExchange of salesforce.com, etc.). When a user downloads and installs a mobile application 215 onto a mobile computing device 210, the mobile application 215 may be stored in a memory of the mobile computing device 210. A representation (e.g., icon) of that mobile application may also be displayed on a touch-sensitive display 220 of the mobile computing device so that it can be invoked by the user. The mobile application 215 may be invoked by tapping on an area of the touch-sensitive display 220 where the representation is displayed. When the mobile application 215 is associated with a corporation (e.g., salesforce.com), the user may need to provide sign-in information (e.g., user name and password) to sign in and access information associated with the corporation.

There may be multiple mobile applications running in a mobile computing device 210, with one running in the foreground while the others running in the background. Only the mobile application running in the foreground can interact with the user. There may be times when it is necessary for one mobile application (referred to as a source application) to communicate with another mobile application (referred to as a target application). For example, one mobile application may want to share information or use the functionality available with the other mobile application. Under the iOS environment, it may be possible for the source application to use the custom Uniform Resource Locator (URL) scheme to communicate with and transfer information with the target application. The custom URL scheme allows a mobile application to register its custom protocol so that other mobile applications can use it. For example, a Chatter mobile application from salesforce.com of San Francisco, Calif. may register a custom URL identifier "chatter://" and a URL scheme "signin" to enable another mobile application to use the custom URL scheme "chatter://signin" to connect to it. A FedEx mobile application may register a custom URL identifier "fedex://" and a URL scheme "tracking" to enable another mobile application to use the custom URL scheme "fedex://tracking" to track status of a particular delivery. The process performed by the FedEx mobile application may be referred to as handling an event.

The custom URL may be opened inside the source application by including the information (e.g., FedEx tracking number) to be transferred in an object and including a code to call the method "openURL" which then launches the specified target application and transfers information in the object to the target application. When a custom URL associated with a target application is called from a source application, the target application is launched in the foreground and control is transferred from the source application to the target application to handle the "event." The source application may be placed in the background running an "event loop" until the "event" is completed by the target application and control is transferred back to the source application.

It may be necessary for the target application to be downloaded and installed on the mobile computing device 210 and for the custom URL associated with the target application to be registered for the call to the method "openURL" to be successfully executed. To register a custom URL, the target application includes information about the custom URL scheme that the target application supports in its information property list or "Info.plist" file. The "Info.plist" file may also include other information (referred to as metadata) about the mobile application. The "Info.plist" file is included in a "bundle" which may also include other information (e.g., code, resources, etc.) related to the mobile application. A unique bundle ID may be specified by the developer of the mobile application. When the mobile application is submitted to the application distribution center (e.g., App Store), the bundle ID is made part of a unique application ID which makes the mobile application unique in the application distribution center (e.g., App Store).

It may be noted that even though each mobile application in the application distribution center is associated with a unique bundle ID and application ID, it may be possible that some mobile applications may have similar custom URL scheme in their "Info.plist" files. Thus, if two mobile applications having the same custom URL scheme in their "Info.plist" files happen to be downloaded and installed on the mobile computing device 210, the operating system in the mobile computing device 210 may be confused as to which of the two mobile applications is the correct target application to invoke when the custom URL scheme is called by a source application. It may be possible that the custom URL scheme of the mobile application most recently installed is invoked, or it may be possible that the custom URL scheme of the mobile application installed earlier is invoked. A malicious mobile application may include a custom URL scheme similar to a custom URL scheme of a legitimate target application and intercept the information transferred by the source application. This situation exposes a security risk in the URL scheme and to the confidential information transferred by the source application.

Figure 3:
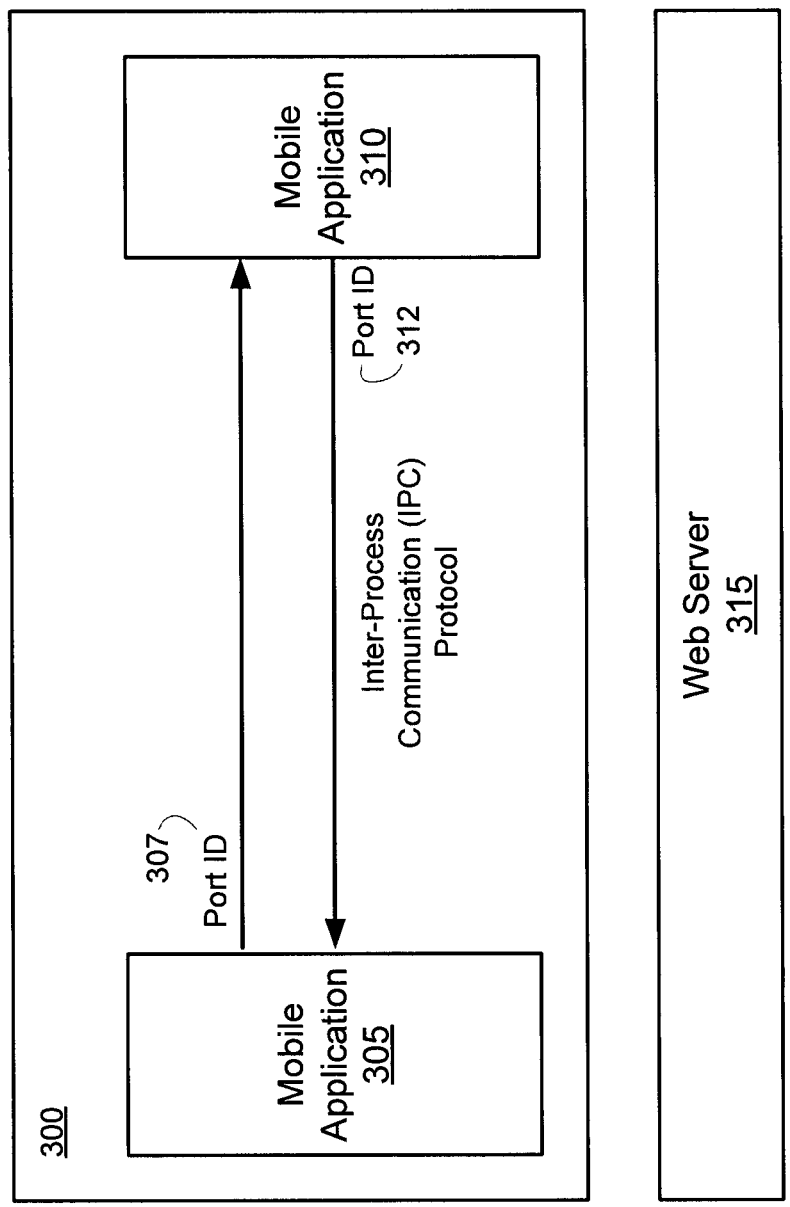
FIG. 3 is a diagram that illustrates an example of establishing a communication between two mobile applications using Inter-Process Communication (IPC), in accordance with some implementations.

FIG. 3 is a diagram that illustrates an example of establishing a communication between two mobile applications using Inter-Process Communication (IPC), in accordance with some implementations. Mobile computing device 300 may include two mobile applications 305 and 310 and may be coupled with a web server 315 via a network. For some implementations, instead of using the custom URL scheme described with FIG. 2, IPC may be used to enable the mobile applications to share information and/or to use the functionality of one another. In the current example, in order for the mobile application 305 to invoke the mobile application 310, a bi-directional channel may need to be established. The mobile application 305 may request the operating system to open a first socket (or end point) and assign a port with a port ID 307 to that socket. The first socket is associated with the mobile application 305, and may be used by the mobile application 305 to accept incoming connection from the mobile application 310. The mobile application 305 may then request the operating system to let the mobile application 310 become aware of the first socket and its associated port ID 307.

Upon learning about the first socket and the port ID 307, the mobile application 310 may request the operating system to open a second socket and assign a port with a port ID 312 to the second socket. The second socket is associated with the mobile application 310. The mobile application 310 may then request the operating system to connect the second socket to the first socket. A connection request may then be sent to the mobile application 305 via the port ID 307. An acknowledgment of the connection request may then be sent to the mobile application 310 via the port ID 312, and a bi-directional channel may be established between the two mobile applications 305 and 310. The mobile applications 305 and 310 can then transfer information to one another by writing the information to its respective socket. By using the IPC, the communication and sharing of information between the two mobile applications 305 and 310 may be more secured comparing to using the URL scheme.

Figure 4A:
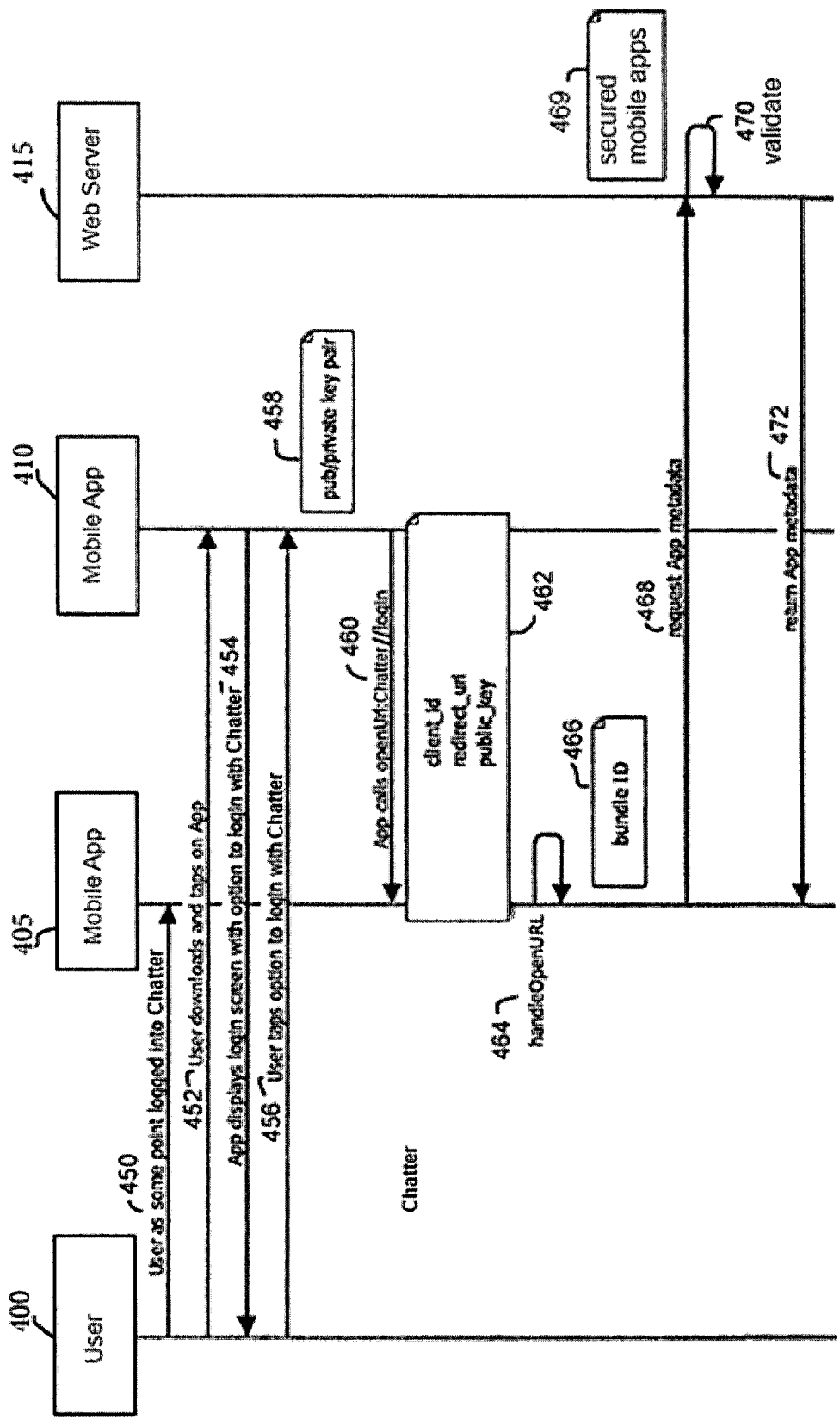
FIGS. 4A and 4B are event diagrams that illustrate a series of example events that may enable a user to use the services of several mobile applications with single sign-in information, in accordance with some implementations.
Figure 4B:
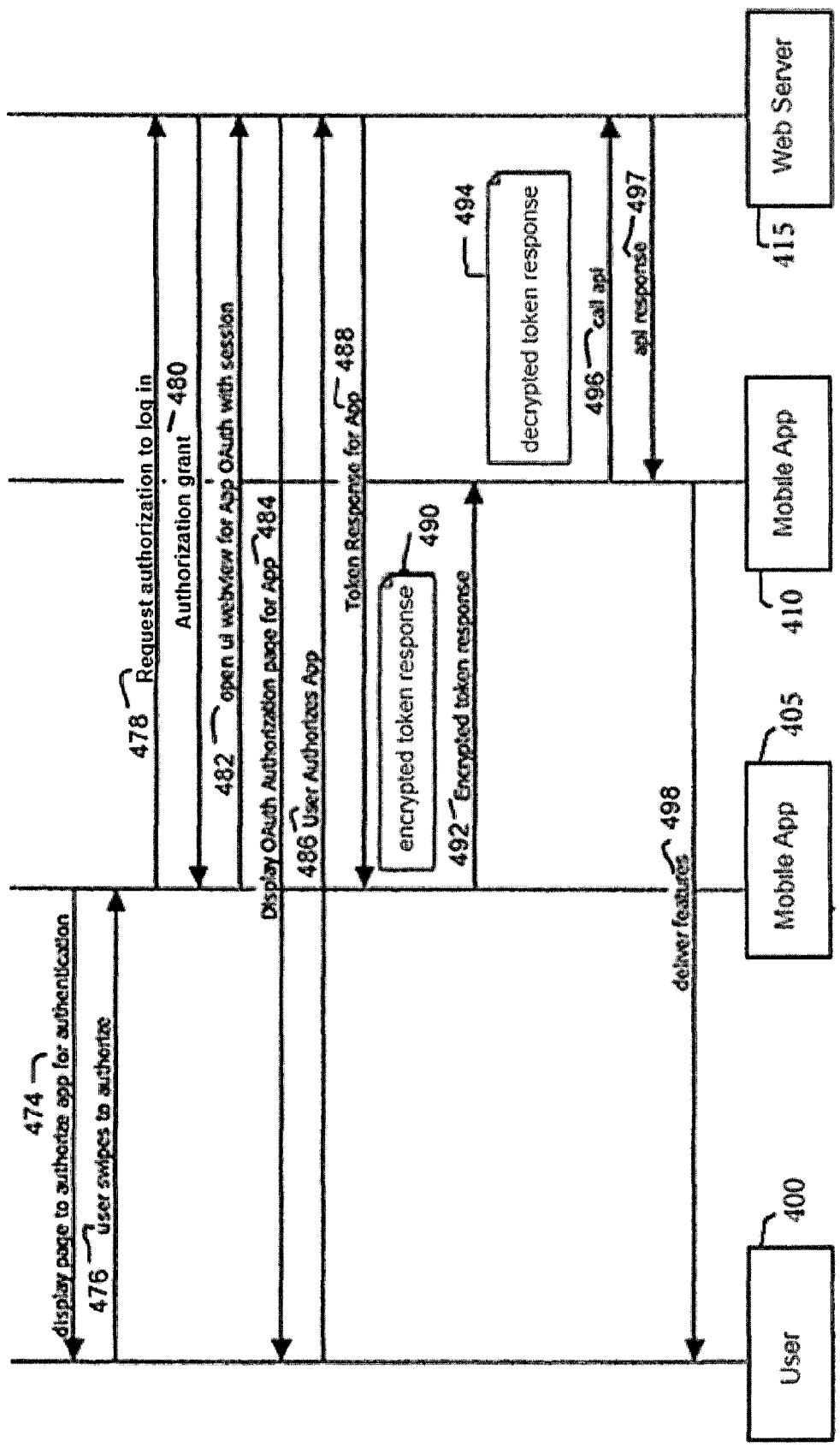

FIGS. 4A and 4B are event diagrams that illustrate a series of example events that may enable a user to use the services of several mobile applications with single sign-in information, in accordance with some implementations. In this example, a user 400 may be using a mobile computing device such as the mobile computing device 300 illustrated in FIG. 3. The mobile computing device 300 may include two mobile applications: mobile application 405 and mobile application 410. Both mobile applications 405 and 410 may be associated with a web server 415 and may access information (e.g., customer data, etc.) from the web server 415 on the user's behalf. The web server 415 may also be referred to as a resource server. The web server 415 may be associated with an entity that provisions authorization. For example, the mobile application 405 may be the salesforce.com Chatter downloadable mobile application of salesforce.com, the mobile application 410 may be a downloadable third party mobile application such as a FedEx shipping application developed to integrate with the salesforce.com platform, and the web server 415 may be a salesforce.com server.

For some implementations, the Open Authorization (OAuth) protocol may be used. The current version of the OAuth protocol is 2.0 and is an open standard published in October 2012 by the Internet Engineering Task Force (IETF) organization as RFC 6749. OAuth may be used as a mechanism to enable the mobile application 410 to access information from the web server 415 on behalf of the user 400 without the user 400 having to provide the user's authentication information (e.g., username and password) to the mobile application 410. For example, the Chatter API from salesforce.com uses OAuth to securely identify the mobile application before connecting to the salesforce.com server. Instead of the mobile application having to store the user's sign-in information, the mobile application may prompt the user to sign in using a standard salesforce.com page, which returns an access token to mobile application. The mobile application may use this access token to access Chatter API Web services.

Each of the mobile applications 405 and 410 may need to be registered with the web server 415 to receive an API key (also referred to as client ID to identify the mobile application with the web server 415) and an API secret which may be subsequently used to request the web server 415 for an access token. The type of information to be accessed (also referred to as scope or permission) from the web server 415 by a mobile application may also need to be specified during the registration process.

As illustrated in FIG. 4A, event 450 indicates the user 400 logging into the mobile application 405 using the user's sign-in information (e.g., username and password). Event 452 indicates the user 400 downloading the mobile application 410 (assuming it has not been previously downloaded). The user 400 may then launch the mobile application 410 by tapping on the touch-sensitive screen.

Event 454 indicates the mobile application 410 displaying to the user 400 a sign-in screen with option to sign in with the first mobile application 405. This is instead of having to provide sign-on information to the second mobile application 410. Event 456 indicates the user 400 responding to the mobile application 410 that the user 400 wants to use option to sign in with the mobile application 405 (e.g., the Chatter downloadable mobile application).

Based on receiving the response from the user 400 via the event 456, the mobile application 410 may generate encryption information that includes a public and private key pair 458. Event 460 indicates the mobile application 410 invoking the mobile application 405 by including in its code a call to the method "openURL" and using a custom URL scheme associated with the mobile application 405. As described herein, the custom URL scheme associated with the mobile application 405 may be stored in the "Info.plist" file of the mobile application 405. In the current example, the custom URL scheme is shown as "chatter://signin". The call to the method "openURL" may be associated with an object 462 which may include the public key of the public and private key pair 458. The object 462 may also include a redirect URI (resource name and location) and a client ID. The redirect URI indicates where the user 400 will be redirected after web server 415 approving or rejecting a request by the mobile application 410. The client ID is the API key assigned to the mobile application 410 by the web server 415 when the mobile application 410 is registered with the web server 415.

Event 464 indicates the mobile application 405 processing the "openURL" call by the mobile application 410. The mobile application 405 may identify the bundle ID 466 associated with the mobile application 410 and include the bundle ID 466 in a message sent to the web server 415, as indicated by event 468. The message may include a request for the metadata associated with the mobile application 410.

For some implementations, the web server 415 may be configured to store information about the mobile applications that are considered to be secured (referred to as secured mobile applications). For example, the web server 415 may maintain a white list 469 of the mobile applications that have been verified as secured. The information about a secured mobile application may include its bundle ID. The web server 415 may also be configured to store the metadata associated with the secured mobile applications. Other information about the secured mobile applications may also be stored. The web server 415 may be configured to use the bundle ID 466 received from the mobile application 405 to determine if the bundle ID 466 is associated with a secured mobile application, as indicated by event 470. Based on the web server 415 successfully validating the bundle ID 466 as being associated with the secured mobile application 410, event 472 indicates the web server 415 transferring the metadata about the mobile application 410 to the mobile application 405.

The events included in FIG. 4B continue from the events included in FIG. 4A. Referring to FIG. 4B, event 474 indicates the mobile application 405 displaying information on the touch-sensitive screen to let the user 400 authorizes the mobile application 405 for authentication. For example, an image or quick action icon may be displayed. Event 476 indicates the user 400 responding to the mobile application 405 that the user 400 authorizes (e.g., by swiping on the quick action icon) the mobile application 405 for authentication. An authorization code may be generated based on the user's swipe gesture during the event 476.

Based on the user 400 authorizing the mobile application 405 for authentication, the mobile application 405 may initiate a request an authorization to allow the mobile application 410 to login to the web server 415, as indicated by event 478.

Event 480 indicates the web server 415 responding to the request from the mobile application 405 with an authorization grant allowing the mobile application 410 to login. Event 482 indicates the mobile application 405 opening a webview for the OAuth with session with the web server 415.

Event 484 indicates the web server 415 displaying the authorization page to the user 400 for the mobile application 410. During event 486, the user 400 is presented with an option to allow or deny access. In the current example, the user 400 authorizes the mobile application 410 to the web server 415 and an authorization grant is submitted.

Event 488 indicates the web server 415 providing a token response to the mobile application 405. This token response may include an access token 490 for the mobile application 410.

The token response may be encrypted by the mobile application 405 using the public key generated by the mobile application 410. This generates the encrypted token response 490. Event 492 indicates the mobile application 405 providing the encrypted token response 490 to the mobile application 410. The encrypted token response 490 may then be decrypted by the mobile application 410 by using its private key from the public and private key pair 458 (shown in FIG. 4A). This generates a decrypted token response 494. The decrypted token response 494 may include an access token and a refresh token, and both tokens may be saved by the mobile application 410.

Event 496 indicates the mobile application 410 accessing information in the web server 415 using the access token from the decrypted token response 494 by calling the appropriate web server API. Event 497 indicates the web server 415 providing the information to the mobile application 410 via an API response. Event 498 indicates the mobile application 410 delivering its services and features to the user 400.

For some implementations, instead of having the mobile application 410 generating the public-private key pair 458 and using it to create the encrypted token 490 and the decrypted token 494, the user 400 may be prompted to provide a user secret code during the event 486 and a copy may be sent to the mobile computing devices 405 and 410. The user secret code may then be used by the mobile application 405 to encode the access token received from the event 488. The encoded access token may then be sent to the mobile application 410 during the event 492, and then decoded by the mobile application 410.

For some implementations, the events described in FIGS. 4A and 4B may be implemented to enable the mobile application 405 to be used as a proxy to enable the user 400 to extend the functionality of the mobile application 405 with the functionality of the mobile application 410. This is advantageous because the size of the mobile application 405 may be kept small while its functionality may be enriched by being complementary to the functionality offered by the mobile application 410. The user 400 may sign on to a web server 415 using the mobile application 405 (e.g., event 450). The user 400 may cause the mobile application 410 to invoke the mobile application 405 (e.g., events 456, 460). The mobile application 405 may request the web server 415 to authenticate the mobile application 410 (e.g., events 468, 472). Upon receiving an access token from the web server 415 (events 488 and 492), the user 400 may use the functions and features of the target mobile application 410 to access information from the web server 415 on behalf of the user 400 without the user having to provide sign-on information to the mobile application 410.

For some implementations, the mobile application 410 may be used as a proxy to the mobile application 405 to enable the mobile application 405 to deliver services to the user 400. For some implementations, using the same scheme, the mobile application 410 may be configured to invoke another mobile application (not shown), and operates as a gateway to the connection to this other mobile application. Control may then be transferred from the mobile application 410 to the other mobile application to deliver services to the user 400.

For some implementations, it may be possible that the communications that occur between the mobile applications 405 and 410 shown in FIGS. 4A and 4B are based on the IPC protocol described with FIG. 3. For example, instead of using the method "openURL" and the custom URL scheme "chatter://signin" in the event 460, the mobile application 410 may transfer the appropriate information to the mobile application 405 via a socket connection established using the IPC.

Although the above description refer to various servers such as the application distribution server, the resource server, and the verification server, it may be possible that the functionalities of one or more of these servers may be combined.

Figure 5:
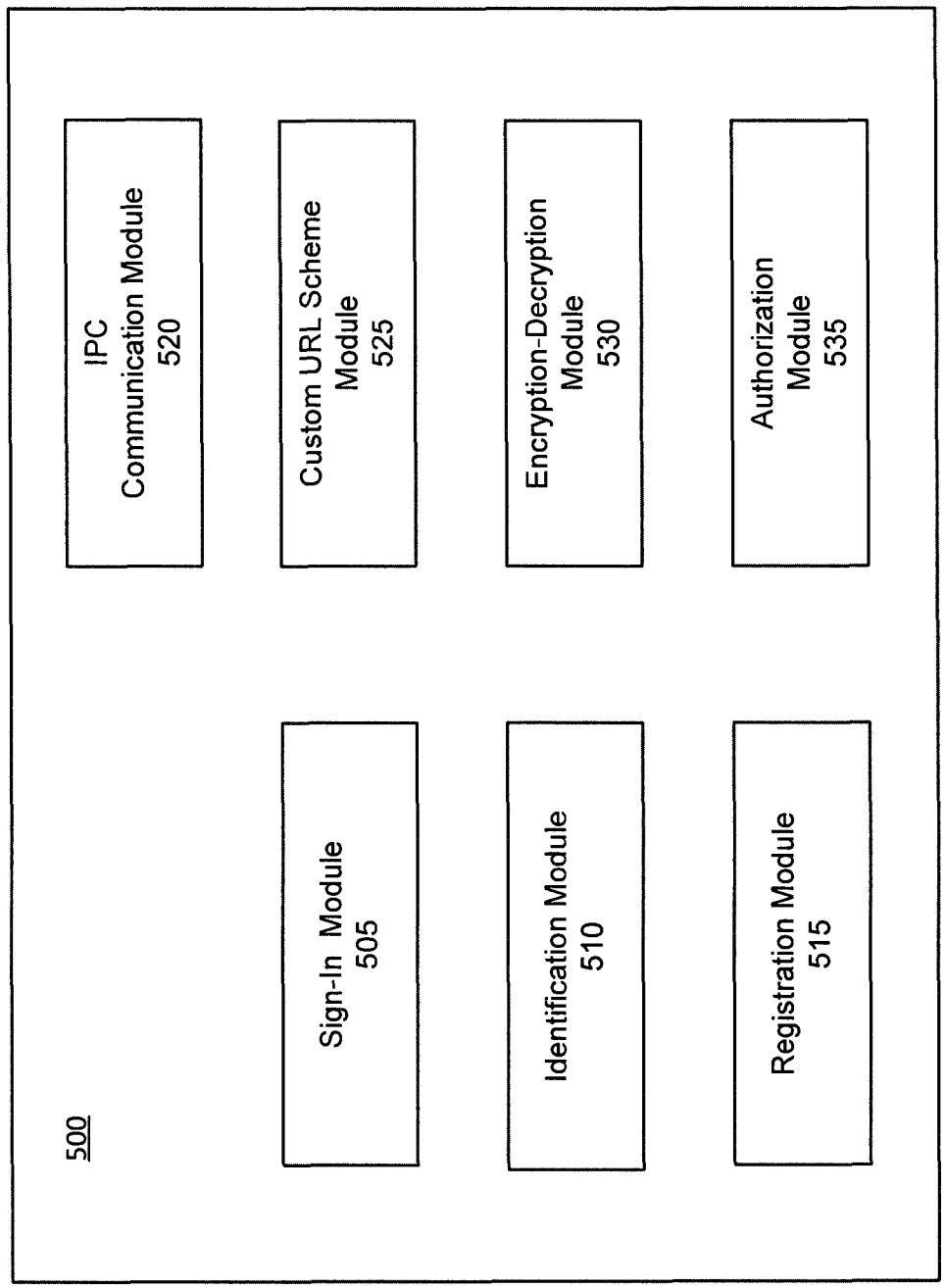
FIG. 5 is a block diagram that illustrates example functional modules of a mobile computing device, in accordance with some implementations.

FIG. 5 is a block diagram that illustrates example functional modules of a mobile computing device, in accordance with some implementations. Mobile computing device 500 may include many of the functional modules described in FIG. 1 and may also include sign in module 505, identification module 510, registration module 515, IPC communication module 520, custom URL scheme module 525, encryption-decryption module 530 and authorization module 535. Although not shown, other modules may also be included in the mobile computing device 500 to enable it to perform the functions as described herein. The sign in module 505 may be configured to provide a user (e.g., user 400 shown in FIGS. 4A and 4B) an option to one mobile application with another mobile application (e.g., event 454).

The identification module 510 may be configured to enable a mobile application to be assigned an identification number (e.g., bundle ID) that is unique in an application distribution center. The registration module 515 may be configured to enable a mobile application to be registered with a web server (e.g., web server 415) to obtain an API key and API secret so that they can be used to obtain an access token from the web server. The IPC communication module 520 may be configured to enable a mobile application to engage in a secured communication with another mobile application (as described in FIG. 3). The custom URL scheme 525 module may be configured to enable a mobile application to set up entry points that may be called by another mobile application (e.g., event 460). The encryption-decryption module 530 may be configured to enable a mobile application to generate a public and private key pair to securely protect an access token (e.g., events 488 and 492). The authorization module 535 may be configured to enable a mobile application to participate in an authentication and authorization protocol (e.g., OAuth protocol) with a web server (e.g., web server 415) such as, for example, the steps of requesting for an access token and a refresh token and the process of using the refresh token to request for a new access token, etc.

Although some of the modules in FIG. 5 are illustrated as individual modules, it may be possible that the function of two or more of these modules may be combined into one module, or that the function of one module may be divided into two or more modules, depending on the implementation. Other modules may also be used to enable the mobile computing device 500 to participate in the operations described with FIGS. 3, 4A and 4B.

Figure 6:
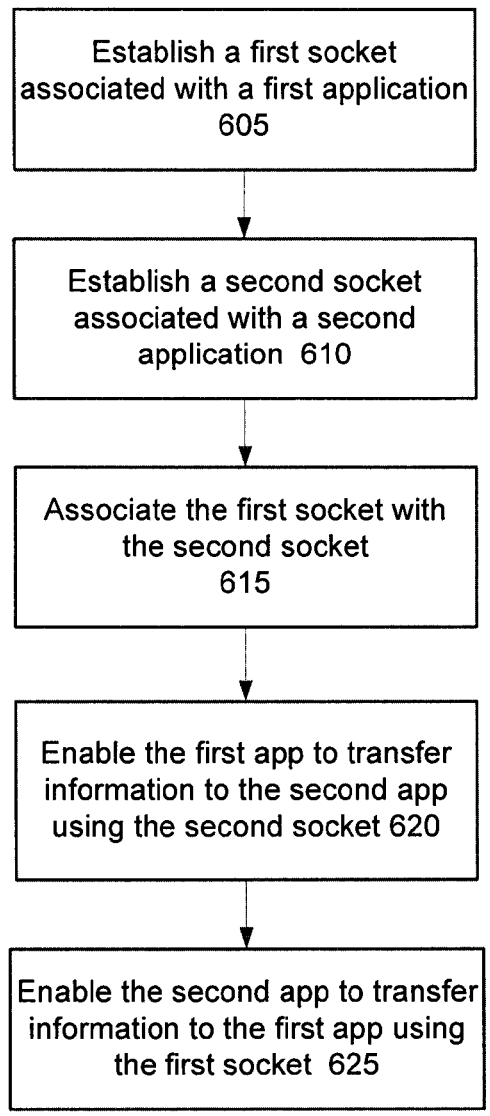
FIG. 6 is a flow diagram that illustrates example method of enabling secured inter-application communication, in accordance with some implementations.

FIG. 6 is a flow diagram that illustrates an example process of enabling secured inter-application communication, in accordance with some implementations. The process may enable two mobile applications running in a mobile computing device to share information securely. The process may start at block 605 where a first socket may be assigned to a first mobile application. At block 610, a second socket may be assigned to a second mobile application. The assignment of the first socket and the second socket may be performed by an operating system running in the mobile computing device. At block 615, the first socket may be associated with the second socket. At block 620, the first mobile application may be enabled to transfer information to the second mobile application using the second socket. At block 625, the second mobile application may be enabled to transfer information to the first mobile application using the first socket. As described with FIG. 3, the first socket may be assigned to a first port ID, and the second socket may be assigned to a second port ID.

Figure 7:
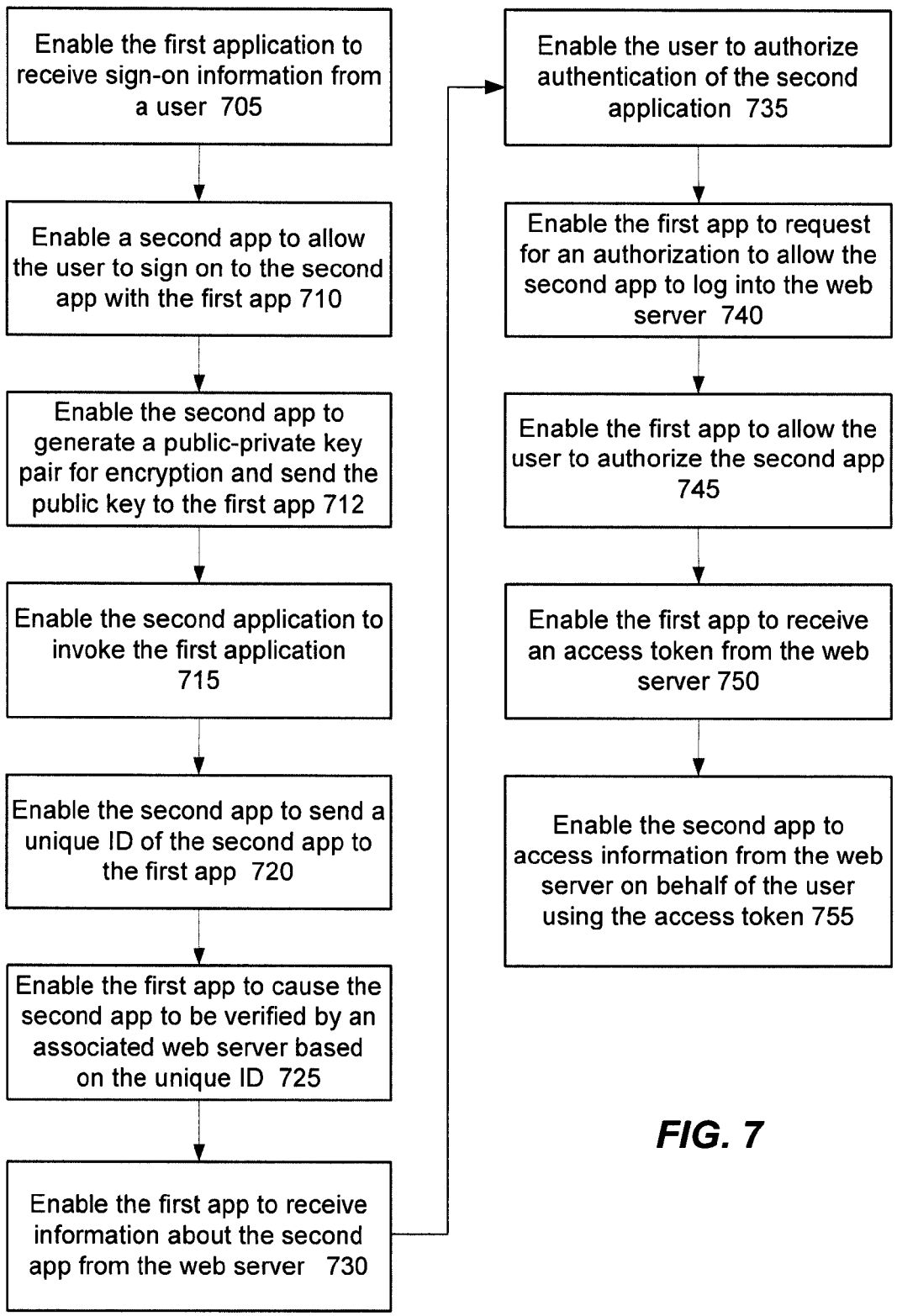
FIG. 7 is a flow diagram that illustrates example method of enabling secured inter-application communication, in accordance with some implementations.

FIG. 7 is a flow diagram that illustrates an example process of using single sign-on information to deliver services, in accordance with some implementations. The process may be performed by a mobile computing device having two or more mobile applications. The mobile computing device may be coupled with a web server via a network such as, for example, those described in FIGS. 2, 8A, 8B, 9 and 10. The process may start at block 705 where a user may be enabled to sign in to a first mobile application, and then at block 710 be able sign in to a second mobile application with the first mobile application and without having to provide sign-on information. At block 712, the second app may be configured to generate a public-private key pair for encryption. At block 715, the second mobile application is configured to invoke the first mobile application and send the public key to the first mobile application. The public key and private key will be used in subsequent steps to encrypt and decrypt an access token. At block 720, the second mobile application is configured to send the first mobile application its unique ID. The unique ID is be used in a subsequent stop to validate that the second mobile application is a trusted application.

At block 725, the first mobile application is configured to cause the second mobile application to be verified by the web server. This may include sending the unique ID of the second mobile application to the web server. At block 730, the first mobile application is configured to receive information about the second mobile application from the web server. At block 735, the first mobile application is configured to enable the user to authorize the second mobile application. At block 740, with the user's authorization, the first mobile application may be configured to request for an authorization to allow the second mobile application to login to the web server. In response to the request, an authorization grant may be sent by the webserver. The authorization grant may enable the second mobile application to log into the web server.

At block 745, the first mobile application may be configured to enable the user to authorize the second mobile application with the web server. This may include submitting the authorization grant to the web server. At block 750, the first mobile application is configured to receive an access token from the web server.

At block 755, the second mobile application is configured to access information from the web server on the user's behalf by using the access token. Thus, the process described with the flow diagram of FIG. 7 may enable the second mobile application to access information and provide services to the user without the user having to sign-on to the second mobile application. The ability of the second mobile application to access the information is based on the availability of the second access token. If the user wants to stop the second mobile application from accessing the information on the web server on the user's behalf, the access token may be revoked.

Figure 8A:
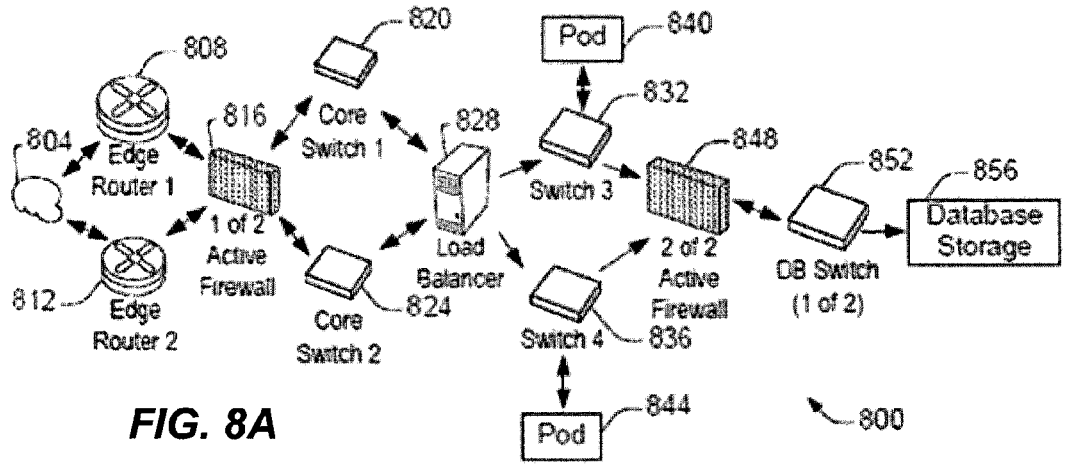
FIG. 8A shows a system diagram that illustrates architectural components of an environment that may be used, in accordance with one implementation. in accordance with some implementations.

FIG. 8A shows a system diagram illustrating architectural components of an environment that may be used, in accordance with one implementation. A client machine located in the cloud 804 (or Internet) may communicate with the environment 800 via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to enable services such as, for example, secured inter-application communication services and single sign-on services. Communication with the pods 840, 844 may be conducted via pod switches 832 and 836. Components of the environment 800 may communicate with a database storage system 856 via a database firewall 848 and a database switch 852.

Figure 8B:
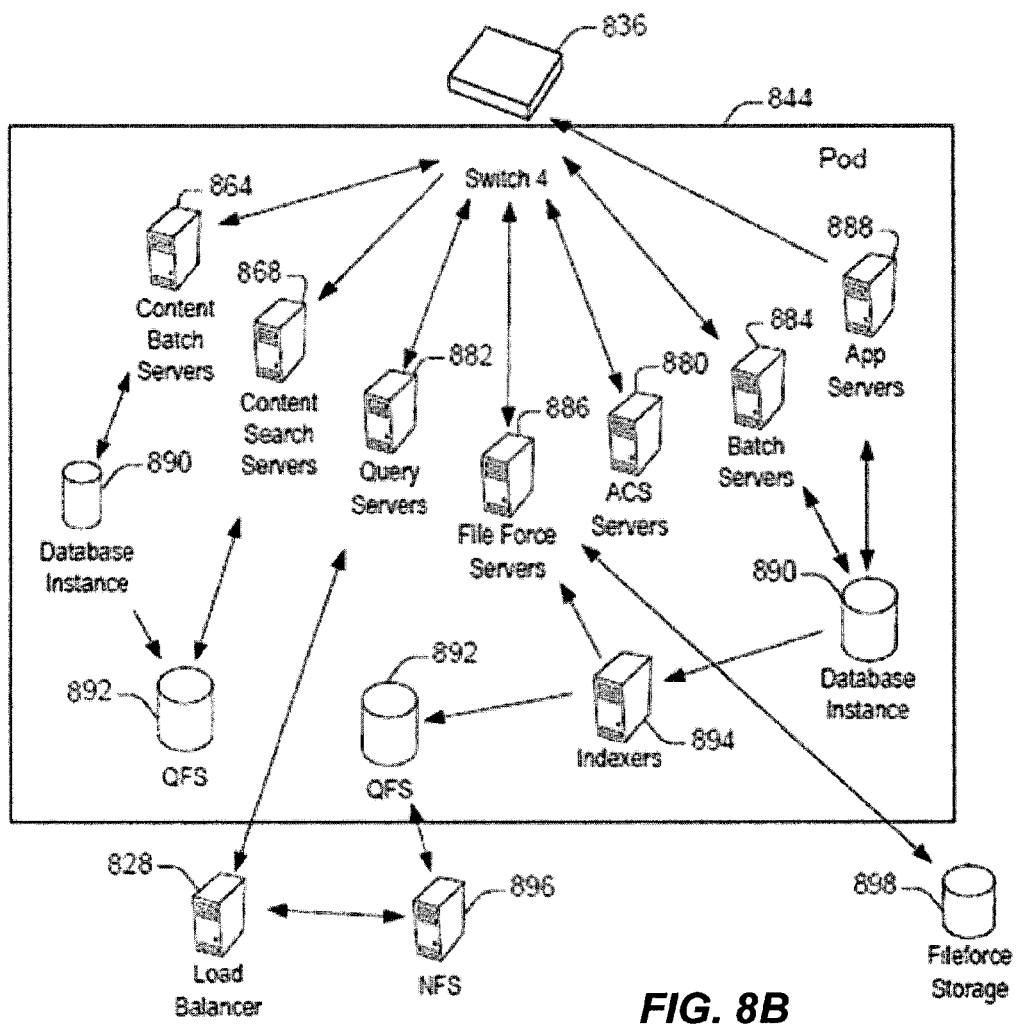
FIG. 8B shows a system diagram that further illustrates architectural components of an environment that may be used, in accordance with some implementations.

As shown in FIGS. 8A and 8B, accessing the environment 800 may involve communications transmitted among a variety of different hardware and/or software components. Further, the environment 800 is a simplified representation of an actual secured environment that may enable providing secured inter-application communication services and single sign-on services. For example, while only one or two devices of each type are shown in FIGS. 8A and 8B, some implementations of the environment 800 may include anywhere from one to many devices of each type. Also, the environment 800 need not include each device shown in FIGS. 8A and 8B, or may include additional devices not shown in FIGS. 8A and 8B.

Moreover, one or more of the devices in the environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the environment 800 to access services provided by the environment 800. For example, client machines may access the environment 800 to retrieve, store, edit, and/or process information.

In some implementations, the edge routers 808 and 812 may route packets between the cloud 804 and other components of the environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more implementations, the firewall 816 may protect the inner components of the environment 800 from Internet traffic. The firewall 816 may block, permit, or deny access to the inner components of the environment 800 based upon a set of rules and other criteria. The firewall 816 may act as one or more of a packet filter, an application gateway, a stateful filter, a proxy server, or any other type of firewall.

In some implementations, the core switches 820 and 824 are high-capacity switches that transfer packets within the environment 800. The core switches 820 and 824 may be configured as network bridges that quickly route data between different components within the environment 800. In some implementations, the use of two or more core switches 820 and 824 may provide redundancy and/or reduced latency.

In some implementations, the pods 840 and 844 may perform the core data processing and service functions provided by the environment 800. Each pod may include various types of hardware and/or software computing resources. An example of the pod architecture is discussed in greater detail with reference to FIG. 8B.

In some implementations, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some implementations, the load balancer 828 may distribute workload between the pods 840 and 844. Balancing the service requests between the pods may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some implementations, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, communication with the database storage system 856 may be conducted via the database switch 852. The multi-tenant database system 856 may include more than one hardware and/or software components for handling database queries. Accordingly, the database switch 852 may direct database queries transmitted by other components of the environment 800 (e.g., the pods 840 and 844) to the correct components within the database storage system 856.

In some implementations, the database storage system 856 is a database system shared by many different organizations. The database system may employ a multi-tenant approach, a virtualized approach, or any other type of database approach. A database system that may be used to support the services offered by the environment 800 is discussed in greater detail with reference to FIGS. 9 and 10.

FIG. 8B shows a system diagram illustrating the architecture of the pod 844, in accordance with one implementation. The pod 844 may be used to render services to a user of the environment 800.

In some implementations, each pod may include a variety of servers and/or other systems. The pod 844 includes one or more content batch servers 864, content search servers 868, query servers 882, file force servers 886, access control system (ACS) servers 880, batch servers 884, and app servers 888. Also, the pod 844 includes database instances 890, quick file systems (QFS) 892, and indexers 894. In one or more implementations, some or all communication between the servers in the pod 844 may be transmitted via the switch 836.

In some implementations, the application servers 888 may include a hardware and/or software framework dedicated to the execution of procedures (e.g., programs, routines, scripts) for supporting the construction of applications provided by the environment 800 via the pod 844. Some such procedures may include operations for providing the services described herein.

The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the environment 800.

The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query server 882 may receive requests for information from the app servers 888 and then transmit information queries to the NFS 896 located outside the pod.

The pod 844 may share a database instance 890 configured as a multi-tenant environment in which different organizations share access to the same database. Additionally, services rendered by the pod 844 may require various hardware and/or software resources. In some implementations, the ACS servers 880 may control access to data, hardware resources, or software resources.

In some implementations, the batch servers 884 may process batch jobs, which are used to run tasks at specified times. Thus, the batch servers 884 may transmit instructions to other servers, such as the app servers 888, to trigger the batch jobs.

In some implementations, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some implementations, one or more query servers 882 may communicate with the NFS 896 to retrieve and/or update information stored outside of the pod 844. The NFS 896 may allow servers located in the pod 844 to access information to access files over a network in a manner similar to how local storage is accessed.

In some implementations, queries from the query servers 882 may be transmitted to the NFS 896 via the load balancer 828, which may distribute resource requests over various resources available in the environment 800. The NFS 896 may also communicate with the QFS 892 to update the information stored on the NFS 896 and/or to provide information to the QFS 892 for use by servers located within the pod 844.

In some implementations, the pod may include one or more database instances 890. The database instance 890 may transmit information to the QFS 892. When information is transmitted to the QFS 892, it may be available for use by servers within the pod 844 without requiring an additional database call.

In some implementations, database information may be transmitted to the indexer 894. Indexer 894 may provide an index of information available in the database 890 and/or QFS 892. The index information may be provided to file force servers 886 and/or the QFS 892.

Figure 9:
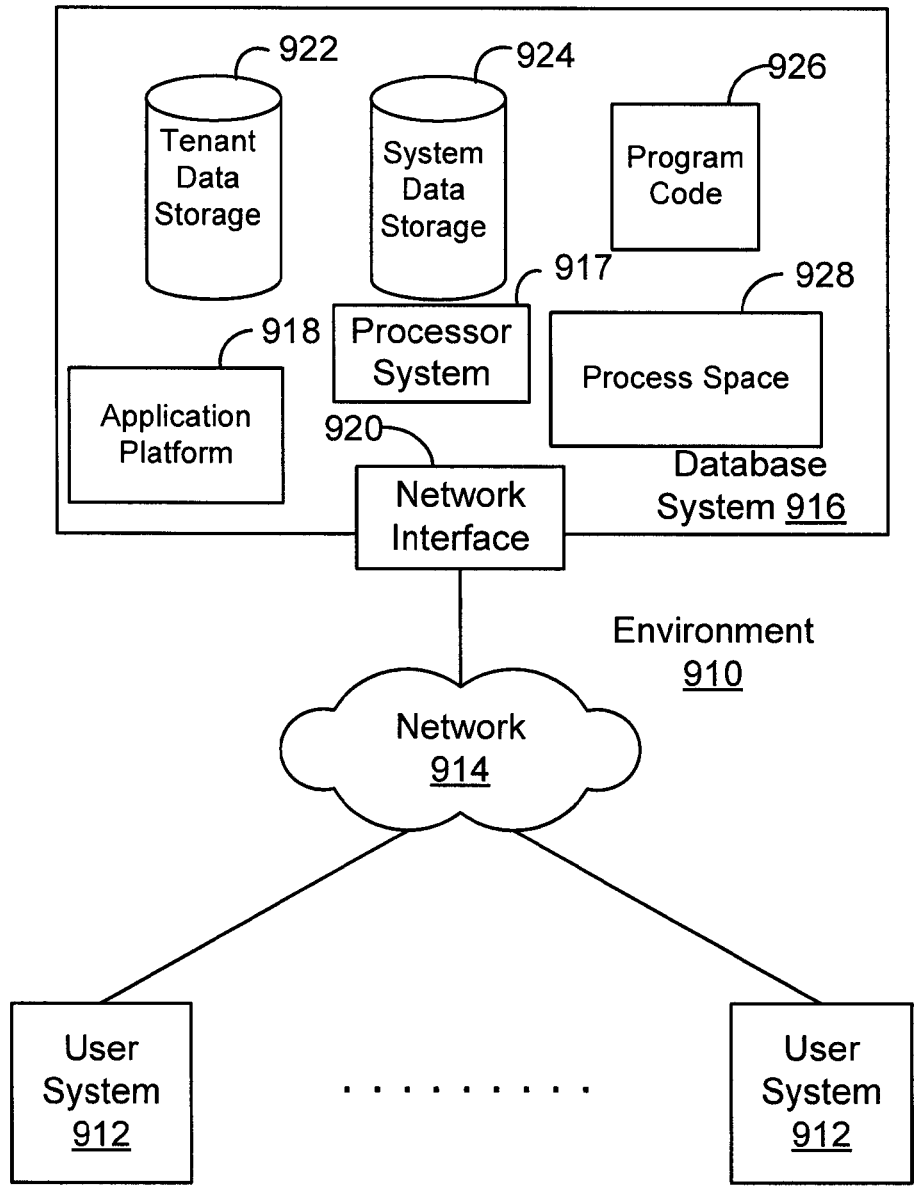
FIG. 9 shows a system diagram illustrating the architecture of a multi-tenant database environment, in accordance with some implementations.
Figure 10:
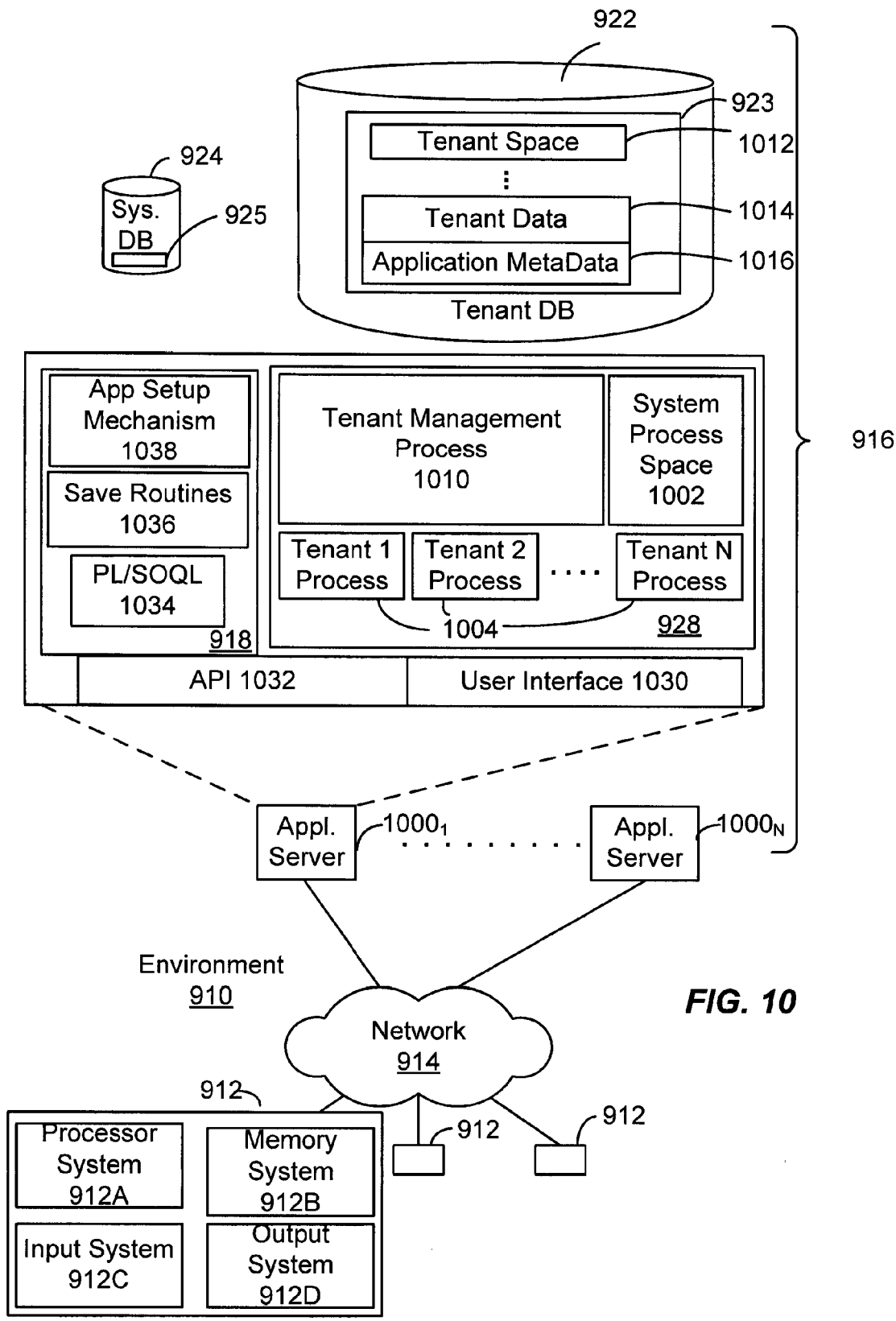
FIG. 10 shows another system diagram further illustrating the architecture of a multi-tenant database environment, in accordance with some implementations.

FIG. 9 shows a system diagram illustrating the architecture of a multi-tenant database environment, in accordance with some implementations. Environment 910 includes a database system 916. User system 912 may be any machine or system that is used by a user to access the database system 916. For example, any of user systems 912 can be a handheld computing device, a mobile phone, a laptop computer, a work station, and/or a network of computing devices. As illustrated in FIGS. 9 and 10, user systems 912 might interact via a network 914 with the database system 916.

A database system, such as system 916, is one that is made available to outside users that do not need to necessarily be concerned with building and/or maintaining the database system, but instead may be available for their use when the users need the database system (e.g., on the demand of the users). Some database services may store information from one or more tenants stored into tables of a common database image to form a multi-tenant database system (MTS).

The terms "database system 916" and "system 916" are used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, system 916 may include an application platform 918 that enables creation, managing and executing one or more applications developed by the provider of the database service, users accessing the database service via user systems 912, or third party application developers accessing the system 916e via user systems 912.

One arrangement for elements of system 916 is shown in FIG. 9, including a network interface 920, application platform 918, tenant data storage 922 for tenant data, system data storage 924 for system data accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 916, shown in FIG. 9, implements a web-based customer relationship management (CRM) system. For example, in one implementation, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 shows another system diagram further illustrating the architecture of a multi-tenant database environment further illustrating system 916 and various interconnections, in accordance with some implementations. User system 912 may include processor system 912A, memory system 912B, input system 912C, and output system 912D. FIG. 10 shows network 914 and system 916. The system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other implementations, environment 910 may not have the same elements as those listed above and/or may have other elements instead of, or in addition to, those listed above.

User system 912, network 914, system 916, tenant data storage 922, and system data storage 924 are discussed with FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. The system 916 may include a network interface 920 implemented as a set of HTTP application servers 1000 (shown in FIG. 10), an application platform 918, tenant data storage 922, and system data storage 924 Also shown in FIG. 10 is system process space 1002, including individual tenant process spaces 1004 and a tenant management process space 1010. Each application server 1000 may be configured to include tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 1034 that provides a programming language style interface extension to API 1032. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain implementations, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one implementation, therefore, an interface system implementing a load balancing function (e.g., an F5 Big-IP load balancer) is communicably coupled between the application servers 1000 and the user systems 912 to distribute requests to the application servers 1000. In one implementation, the load balancer uses a least connections algorithm to route user requests to the application servers 1000. Other examples of load balancing algorithms, such as round robin and observed response time, also can be used. For example, in certain implementations, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain implementations, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for a database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A method for secured inter-application communication, comprising:
  requesting, by a first application running on a mobile computing device, that a first socket be opened by an operating system of the mobile computing device, the first socket being associated with the first application;
  receiving, by the first application, an identifier of the first socket from the operating system, the identifier being a first port ID associated with the mobile computing device and defining an endpoint of the first socket;
  requesting, by the first application, that a second application running on the mobile computing device be provided with the first port ID;
  requesting by the second application, in response to receiving the first port ID, that a second socket be opened by the operating system of the mobile computing device, the second socket being associated with the second application;
  receiving, by the second application, an identifier of the second socket from the operating system, the identifier being a second port ID associated with the mobile computing device and defining an endpoint of the second socket;
  requesting by the second application, in response to receiving the first port ID, that the second socket be coupled to the first socket;
  establishing a bi-directional channel via the first and second sockets; and
  transferring information from the first application to the second application via the bi-directional channel, the information causing functions of the second application to be made available via an interface of the first application.

2. The method of claim 1, further comprising communicating information about the second socket to the first application.

3. The method of claim 2, further comprising:
transferring information from the second application to the first application using the bi-directional channel, the information from the second application comprising a functionality of the second application that is not included in the first application.

4. The method of claim 3, wherein the transferring information from the second application to the first application comprises:
launching the second application in the foreground on the mobile computing device, thereby transferring control of an event from the first application to the second application;
placing the first application in an event loop until the event is completed; and
returning the first application to the foreground on the mobile computing device in response to the completion of the event.

5. The method of claim 1, wherein the first application is running in the foreground on the mobile computing device and the second application is running in the background, wherein a user can only interact with a mobile application running in the foreground on the mobile device.

6. A computer program product comprising a non-transitory computer readable medium having computer-readable program instructions embodied therein, the computer readable program instructions adapted to be executed by one or more processors to implement a method for secured inter-application communication, the program instructions include:
requesting, by a first application running on a mobile computing device, that a first socket be opened by an operating system of the mobile computing device, the first socket being associated with the first application;
receiving, by the first application, an identifier of the first socket from the operating system, the identifier being a first port ID associated with the mobile computing device and defining an endpoint of the first socket;
requesting, by the first application, that a second application running on the mobile computing device be provided with the first port ID;
requesting, by the second application, in response to receiving the first port ID, that a second socket be opened by the operating system of the mobile computing device, the second socket being associated with the second application;
receiving, by the second application, an identifier of the second socket from the operating system, the identifier being a second port ID associated with the mobile computing device and defining an endpoint of the second socket;
requesting, by the second application, in response to receiving the first port ID, that the second socket be coupled to the first socket;
establishing a bi-directional channel via the first and second sockets; and
transferring information from the first application to the second application via the bi-directional channel, the information causing functions of the second application to be made available via an interface of the first application.

7. The computer program product of claim 6, further comprising communicating information about the second socket to the first application.

8. The computer program product of claim 6, further comprising:
transferring information from the second application to the first application using the bi-directional channel, the information from the second application comprising a functionality of the second application that is not included in the first application.

9. The computer program product of claim 8, wherein the transferring information from the second application to the first application comprises:
launching the second application in the foreground on the mobile computing device, thereby transferring control of an event from the first application to the second application;
placing the first application in an event loop until the event is completed; and
returning the first application to the foreground on the mobile computing device in response to the completion of the event.

10. The computer program product of claim 6, wherein the first application is running in the foreground on the mobile computing device and the second application is running in the background, wherein a user can only interact with a mobile application running in the foreground on the mobile device.

* * * * *